United States Patent
Jahn et al.

(10) Patent No.: US 12,286,762 B2
(45) Date of Patent: Apr. 29, 2025

(54) FOUNDATION STRUCTURE OF AN OFFSHORE STRUCTURE WITH A TRANSMISSION CABLE AND A PROTECTION ELEMENT

(71) Applicant: RWE Renewables GmbH, Essen (DE)

(72) Inventors: Christian Jahn, Quickborn (DE); Sebastian Obermeyer, Hamburg (DE)

(73) Assignee: RWE Renewables GmbH, Essen (DE)

( * ) Notice: Subject to any disclaimer, the term of this patent is extended or adjusted under 35 U.S.C. 154(b) by 221 days.

(21) Appl. No.: 17/605,624

(22) PCT Filed: Mar. 16, 2020

(86) PCT No.: PCT/EP2020/057089
§ 371 (c)(1),
(2) Date: Oct. 22, 2021

(87) PCT Pub. No.: WO2020/216529
PCT Pub. Date: Oct. 29, 2020

(65) Prior Publication Data
US 2022/0205209 A1 Jun. 30, 2022

(30) Foreign Application Priority Data
Apr. 23, 2019 (DE) ............ 10 2019 110 506.4

(51) Int. Cl.
*F03D 13/40* (2016.01)
*E02D 27/04* (2006.01)
(Continued)

(52) U.S. Cl.
CPC ........... *E02D 27/04* (2013.01); *E02D 27/425* (2013.01); *E02D 27/50* (2013.01); *E02D 27/525* (2013.01);
(Continued)

(58) Field of Classification Search
CPC ......... B63B 79/30; B63B 71/10; B63B 79/10; B63B 71/00; B63B 79/15; B63B 49/00;
(Continued)

(56) References Cited

U.S. PATENT DOCUMENTS 3,612,177 A * 10/1971 Gassett .................. E21B 41/08
166/344
4,511,115 A * 4/1985 Ludwigsen ............. B63B 35/44
248/580
(Continued)

FOREIGN PATENT DOCUMENTS

DE 102009040648 B4 2/2013
EP 3034388 B1 2/2019
(Continued)

*Primary Examiner* — Edwin J Toledo-Duran
(74) *Attorney, Agent, or Firm* — The Webb Law Firm (57) ABSTRACT

Described and disclosed is a foundation structure of an offshore structure, in particular of a wind turbine, with a floating foundation, including at least one floating body for floating on the surface of the sea, at least one anchor for anchoring the at least one floating body the seafloor and at least one holding element for holding the at least one floating body to the at least one anchor. At least one transmission cable extends from the at least one anchor along the at least one holding element to the at least one floating body and/or back. To enable a reliable monitoring of the anchoring of the offshore structure, provision is made for the transmission cable to be guided in sections through at least one protection element provided between the holding element and the at least one anchor and/or the at least one floating body.

9 Claims, 4 Drawing Sheets

(51) Int. Cl.
*E02D 27/42* (2006.01)
*E02D 27/50* (2006.01)
*E02D 27/52* (2006.01)
*F03D 13/25* (2016.01)

(52) U.S. Cl.
CPC .......... *F03D 13/25* (2016.05); *E02D 2600/30* (2013.01); *E02D 2600/40* (2013.01); *F05B 2240/93* (2013.01)

(58) Field of Classification Search
CPC ......... B63B 79/40; B63B 79/00; B63B 71/20; B63B 21/50; B63B 35/44; B63B 2035/446; B63B 21/29; E21B 17/01; G01S 13/937; G01S 13/865; G01S 17/93; G01S 13/956; G01M 3/00; G01L 5/0038; G01L 5/167; G01L 1/246; G01L 5/105; G01B 11/16; G01B 11/18; Y02T 70/10; Y02T 70/00; Y02A 90/10; Y02A 20/00; G01D 5/35316; G01D 5/35354; D04C 1/02; D07B 1/145; D07B 2501/2061; D07B 2201/2096; D07B 2301/5577; F03D 9/25; F03D 13/40; F03D 80/85; F03D 13/10; F03D 80/00; F03D 13/25; F03D 80/50; Y02E 10/727; Y02E 10/30; Y02E 10/72; F05B 2240/93; F05B 2240/95; E02D 27/04; E02D 27/425; E02D 27/50; E02D 27/525; E02D 2600/30; E02D 2600/40; E02D 27/06
See application file for complete search history.

(56) References Cited

U.S. PATENT DOCUMENTS

| | | | | | |
|---|---|---|---|---|---|
| 4,764,313 | A * | 8/1988 | Cameron | ................... | F03D 9/20 416/85 |
| 5,007,482 | A * | 4/1991 | Forsyth | ................... | E21B 43/01 405/172 |
| 5,224,962 | A * | 7/1993 | Karal | ...................... | E02D 23/02 405/209 |
| 6,046,404 | A * | 4/2000 | Figenschou | .......... | H01B 7/0072 138/112 |
| 6,294,844 | B1 * | 9/2001 | Lagerwey | ................ | F03D 13/25 290/55 |
| 6,575,712 | B1 * | 6/2003 | Slavchev | ................ | F04B 45/02 60/497 |
| 7,453,164 | B2 * | 11/2008 | Borden | ................... | F03D 13/25 123/3 |
| 8,471,399 | B2 * | 6/2013 | Lefranc | ................... | F03D 13/25 290/55 |
| 8,729,723 | B2 * | 5/2014 | Boureau | ................ | F03D 80/85 290/55 |
| 11,965,303 | B2 * | 4/2024 | Miller | ..................... | E02D 27/12 |
| 2003/0016886 | A1 * | 1/2003 | Smith | .................... | B65G 51/06 383/33 |
| 2005/0226584 | A1 * | 10/2005 | Williams | ................ | D04C 1/02 385/130 |
| 2005/0229836 | A1 * | 10/2005 | Borgen | ................... | E02D 27/42 114/264 |
| 2006/0082160 | A1 * | 4/2006 | Lee | .......................... | F03D 9/25 290/55 |
| 2006/0269396 | A1 * | 11/2006 | Borgen | ................... | F03D 13/25 415/84 |
| 2008/0089746 | A1 * | 4/2008 | Jakubowski | ............ | F03D 13/22 405/244 |
| 2009/0091136 | A1 * | 4/2009 | Viterna | ................... | F03D 13/40 290/55 |
| 2010/0025043 | A1 * | 2/2010 | Ingebrigtsen | ......... | B63B 25/082 166/369 |
| 2011/0037264 | A1 * | 2/2011 | Roddier | ................ | B63B 39/03 290/55 |
| 2011/0241347 | A1 * | 10/2011 | Boureau | ................... | F03D 9/25 405/195.1 |
| 2013/0028555 | A1 * | 1/2013 | Dailey | ............... | G01D 5/35316 385/12 |
| 2013/0272846 | A1 * | 10/2013 | Inoue | ...................... | F03D 13/25 415/3.1 |
| 2014/0193259 | A1 * | 7/2014 | Borgen | ................ | B63B 21/502 416/85 |
| 2015/0063910 | A1 * | 3/2015 | Meltsov | .................... | E02B 8/00 114/230.14 |
| 2015/0088346 | A1 * | 3/2015 | Lee | ......................... | B63B 79/10 356/32 |
| 2016/0025074 | A1 * | 1/2016 | Sato | ....................... | E02D 27/425 416/85 |
| 2016/0177927 | A1 * | 6/2016 | Saeki | ....................... | F03D 9/25 290/55 |
| 2016/0265506 | A1 * | 9/2016 | Kimura | ............... | F03B 13/1845 |
| 2018/0163532 | A1 | 6/2018 | Zhang et al. | | |

FOREIGN PATENT DOCUMENTS

| | | |
|---|---|---|
| GB | 2513387 B | 6/2015 |
| JP | S51130594 U | 11/1976 |
| WO | 2010071433 A2 | 6/2010 |
| WO | 2018234961 A1 | 12/2018 |

* cited by examiner

FOUNDATION STRUCTURE OF AN OFFSHORE STRUCTURE WITH A TRANSMISSION CABLE AND A PROTECTION ELEMENT

CROSS-REFERENCE TO RELATED APPLICATIONS

This application is the United States national phase of International Application No. PCT/EP2020/057089 filed Mar. 16, 2020, and claims priority to German Patent Application No. 10 2019 110 506.4 filed Apr. 23, 2019, the disclosures of which are hereby incorporated by reference in their entirety.

BACKGROUND OF THE INVENTION

Field of the Invention

The invention relates to a foundation structure of an offshore structure, in particular of a wind turbine, with a floating foundation, comprising at least one floating body for floating on the surface of the sea, at least one anchor for anchoring the at least one floating body to the seafloor and at least one holding element for holding the at least one floating body to the at least one anchor, with at least one transmission cable extending from the at least one anchor along the at least one holding element to the at least one floating body and/or back. The invention further relates to an offshore structure, in particular an offshore wind turbine, with such a foundation structure.

Description of Related Art

Different foundation structures of offshore structures, in particular also of offshore wind turbines, are already known from which a suitable foundation structure can be selected depending on the location of the offshore structure. In the case of most of these foundation structures, in particular monopile, tripod, tripile or jacket foundation structures, the offshore structure is fixedly connected to at least one pillar that sits on the seafloor or is rammed into the seafloor. These foundation structures lend themselves in particular for locations with low to moderate water depths. Many potential locations for offshore structures have, however, water depths of over 30 m often even over 50 m. In the case of water depths of roughly 30 m to over 300 m, foundation structures with floating foundations are increasingly suitable.

Floating foundations generally comprise a floating body that supports the actual offshore structure and that is anchored via two or more anchors in the seafloor. The anchors are in this case fixedly connected to the floating body via anchor ropes or anchor chains and usually allow the floating body to move slightly back and forth to the side. Furthermore, individual anchors can also be connected to a plurality of floating bodies of different offshore structures via a plurality of anchor ropes or anchor chains.

Tensile forces are transmitted to the anchors from the at least one floating body via the anchor ropes or anchor chains, which can lead to the anchors becoming loose. Under certain circumstances, the anchor ropes or anchor chains can tear. In both cases, the exact positioning of the offshore structure is no longer possible or no longer possible in the desired manner. Against this background, there is a need to monitor the anchoring of the offshore structures by means of which it can be detected whether a connection or an anchor has loosened or there is a danger of it becoming loose. In order to achieve this, a transmission cable, which can conduct power or a signal, can be laid between the floating body and at least one anchor, based on which the state of the anchoring can be inferred.

In this case, it must, however, be ensured that the at least one transmission cable is not damaged before there is a weakening or loosening of the connection between the floating body and the seafloor. In this case, the state of the anchoring of the offshore structure could namely not be monitored satisfactorily.

SUMMARY OF THE INVENTION

Therefore, the object underlying the present invention is to design and further develop the foundation structure and the offshore structure of the respective types mentioned at the outset and explained in more detail above in such manner that a reliable monitoring of the anchoring of the offshore structure is made possible.

This object is achieved with a foundation structure as described herein in that the transmission cable is guided in sections through at least one protection element provided between the holding element and the at least one anchor and/or the at least one floating body.

Additionally, the mentioned object is achieved with an offshore structure as described herein in that the foundation structure is formed as described herein.

Although the transmission cable extends in sections from the at least one anchor along the at least one holding element to the at least one floating body and/or in the other direction, the transmission cable is not fixed together with the corresponding holding element on the floating body or on the anchor. In fact, a protection element is provided between the at least one holding element and the floating body and/or the anchor, through which the transmission cable is guided. Therefore, the protection of the transmission cable when passing from the at least one holding element and the floating body and/or the anchor is attributed to the protection element. This region of the transmission cable is namely to a particular extent in danger of being damaged during the operation of the offshore structure. The protection element is therefore not part of the at least one holding element since precisely the connection of the holding element and of the transmission cable together either on the floating body or on the anchor has been recognised as disadvantageous. Additionally, a protection element can be provided between the holding element and the floating body in order to connect the transmission cable to the floating body. Alternatively or additionally, however, a protection element can also be provided between the holding element and the anchor. In both connections, the transmission cable is protected by the protection element such that the danger of damage from external influences on the transmission cable during the operation of the offshore structure can be significantly reduced.

The high protective effect of the protection element is in this case achieved not merely by the protection element being provided between the holding element and the floating body and/or between the holding element and the anchor. The protective effect is in particular also achieved by the transmission cable being guided through the protection element. In this case, the protection element can extend from the holding element, on the one hand, to the floating body or to the anchor, on the other hand. However, this is not necessary. Nevertheless, it is advantageous for achieving a high protective effect if the protection element extends at least predominantly, in particular at least substantially over the entire distance, between the holding element, on the one hand, and the floating body or the anchor, on the other hand.

In the case of a first particularly preferred configuration of the foundation structure, the at least one holding element is formed as an anchor chain or as an anchor rope. In this way, high holding forces for holding the floating body to the corresponding anchor can be absorbed and dissipated easily and reliably. In this case, a particularly durable and reliable fixing of the floating body on the anchor is enabled if the anchor rope is formed of plastic fibres or of metal wires, in particular steel wires. The anchor rope in this case, in particular owing to the mechanical properties, can be what is known as a closed rope, in the case of which the wires or fibres are twisted, i.e. closed into braids and these then into the anchor rope. An anchor rope is obtained by closing or twisting and can be bent multiple times without breaking when doing so. The manufacture of closed ropes made of metal wires or also plastic fibres is known per se.

In order for the transmission cable to be reliably protected against external influences even outside of the connection region of the associated holding element to the floating body and/or to the anchor, the at least one transmission cable can be arranged at least predominantly inside the holding element, in particular inside the anchor rope. In this connection, it is particularly significant that the anchor rope can be many meters, for example over 30 m, over 50 m or even over 100 m, long, while the connection region between the anchor rope and the floating body or the anchor is often only a few meters long. Alternatively or additionally, it can also be provided that the protection element is only a few meters long between the anchor rope and the floating body or the anchor and therefore is much shorter than the holding rope and the transmission cable are long. The integration of the transmission cable into the anchor rope can take place very easily and still offer comprehensive protection if the at least one transmission cable is arranged at least predominantly as a braid or as an insert of the anchor rope inside the anchor rope. In this case, an insert of an anchor rope is at least substantially comprehensive and at least substantially over the entire length of the transmission cable between the floating body and the anchor surrounded by braids of the anchor rope.

The transmission cable is particularly well protected against external influences during the operation of the offshore structure at least in the connection region to the floating body and/or to the anchor if the at least one protection element is formed at least in sections, in particular at least substantially completely, by a tube shaped in the manner of a coil spring. The tube can be elastically deformed like a coil spring in order to avoid the tube breaking and in this case to also keep away from the transmission cable in the tube the forces that act from outside and cause the tube to deform. This succeeds in particular even if the transmission cable is guided at least substantially through the correspondingly shaped tube. In this case, the term, tube, is not necessarily to be understood very narrowly here, the tube thus does not, for example, have to be closed completely around the circumference and the tube also does not have to have a circular or at least substantially oval cross-section, even if this is essentially preferred for the elastic deformation of the tube and the protection of the transmission cable.

In order to further reduce damage to the transmission cable inside the tube or at its ends, it may be expedient if the at least one transmission cable is guided through a tube, whose inner diameter is greater than the outer diameter of the transmission cable by at least 5%, preferably by at least 10%, in particular by at least 20%. In this way, rubbing of the transmission cable at the ends of the tube and/or in the tube is in particular avoided.

It may be useful for the further protection of the transmission cable in the connection region to the floating body and/or to the anchor if the at least one protection element is fixedly connected to the at least one holding element, on the one hand, and/or to the at least one floating body or to the at least one anchor, on the other hand. Forces are in particular introduced directly into the protection element from the holding element, the floating body and/or the anchor. From there, the forces are then not transmitted or transmitted only to a very limited extent to the transmission cable. In fact, the corresponding forces are transmitted to the corresponding protection element and dissipated from there. In order to be able to achieve this constructively simply and also very reliably, it lends itself if at least one end of the protection element is inserted into the holding element and/or, depending on the arrangement of the protection element, into the floating body or into the anchor.

So that the holding forces can be transmitted between the holding element and the floating body regardless of the connection of the transmission cable to the corresponding floating body, it lends itself if the at least one holding element is connected to the at least one floating body by bypassing the at least one transmission cable and/or the at least one protection element. In this way, the transmission cable is at least predominantly relieved of the holding forces. Alternatively or additionally, the at least one holding element can, however, also be connected to the at least one anchor by bypassing the at least one transmission cable and/or the at least one protection element. In the connection region to the anchor, the transmission cable is then accordingly and at least predominantly relieved of the holding forces between the holding element and the corresponding anchor. As a result, the transmission cable is thus further preserved.

So that the at least one protection element is durable, stable and, if necessary, also sufficiently elastic, it may lend itself if the at least one protection element is formed at least partially of a metal, in particular a steel, of a plastic and/or of a fibre-reinforced plastic. In this case, the different materials have particular preferences over the respectively other materials owing to their respective material properties such that different material selections may be preferred owing to different requirements.

The at least one transmission cable can be a communication cable for data transmission or for data exchange or a voltage cable for supplying voltage to an electrical consumer. This facilitates for example the monitoring of the anchoring, the communication or the data transmission between the anchor and the floating body or the supply of voltage to sensors and/or measuring systems. In this connection, it lends itself in particular if the transmission cable comprises at least one metallic line and/or at least one optical waveguide, in particular a fibre optic cable. In this way, power and/or a signal can be transmitted easily and reliably.

To monitor the anchoring of the offshore structure, it lends itself in particular if the at least one transmission cable is connected to a sensor. The sensor can record parameters that indicate the state of the anchoring of the offshore structure. In this case, a motion sensor and/or a vibration sensor are in particular considered. Additionally, it may lend itself if the at least one transmission cable is connected to a measuring system that is, for example, capable of measuring the state of the anchoring and/or determining the state of the anchoring by means of data from the at least one sensor. If the at least one transmission cable is connected to a light source and/or a voltage source, an optical or electrical signal can be transmitted. In this context, it is essentially preferred if the sensor and/or the measuring system and/or the light source and/or the voltage source is formed as part of the anchor and/or of the floating body. This simplifies the monitoring of the anchoring both functionally and constructively.

BRIEF DESCRIPTION OF THE DRAWINGS

The invention is explained in more detail below on the basis of a drawing representing an exemplary embodiment in the drawing

DESCRIPTION OF THE INVENTION

Figure 1:
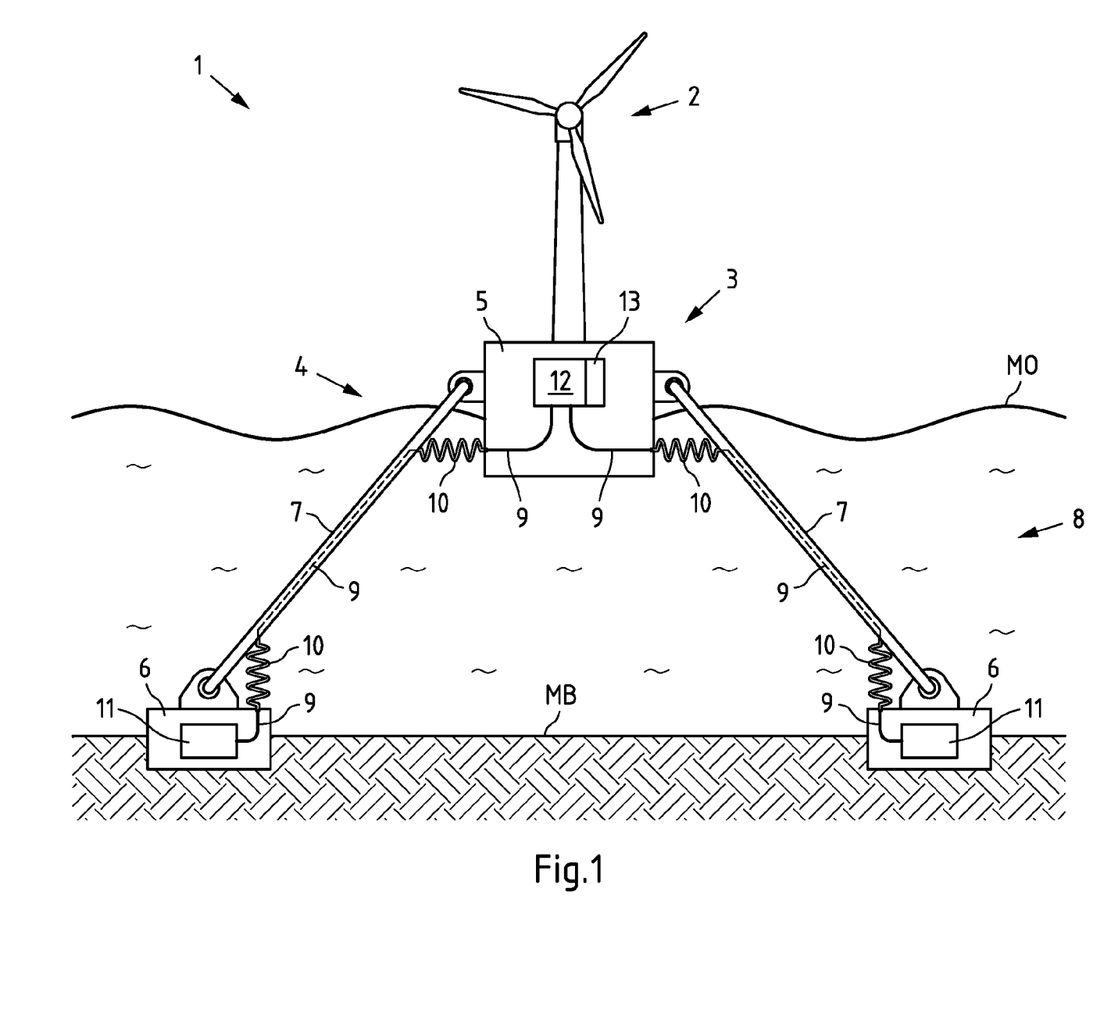
FIG. 1 shows an offshore structure with a floating foundation in a schematic representation.

In FIG. 1, an offshore structure 1 that is an offshore wind turbine 2 is represented. The offshore structure 1 has a foundation structure 3 with a floating foundation 4 that comprises a floating body 5 and a plurality of anchors 6. The floating body 5 supports the actual structure, which is a wind turbine 2 in the present case and floats on the surface of the sea MO or slightly below it. In order that the floating body 5 does not drift away, it is connected via holding elements 7 to the anchors 6, which are for their part anchored in or at least on the seafloor MB. Typically, such floating foundations 4 are considered for offshore structures 1 that are intended to be installed at locations in the sea with significant water depths. For the sake of better understanding, FIG. 1 is therefore not drawn to scale since the height of the offshore structure 1 would then be proportionally small in relation to the water depth. Therefore, a water depth has been represented in the drawing in which a foundation structure 3 without a floating foundation 4 would also be considered. In fact, the holding elements 7 are thus usually much longer in relation to the height of the offshore structure 1.

So that the floating body 5 cannot drift away, it must be ensured that the holding elements 7 hold the floating body 5 securely to the, for example two to four, anchors 6 and that the anchors 6 are also held securely in or on the seafloor MB. This can, however, be achieved only to a limited extent by strong holding elements 7 and anchors 6 driven deep into the seafloor MB since very high load peaks can occur on an individual basis during a storm or for other reasons that can be difficult to predict and calculate. This makes monitoring of the anchoring 8 desirable in order to always be informed about the status or the state of the anchoring 8 during the operation of the offshore structure 1 and be able to intervene before the offshore structure 1 can become loose or drift away.

For this reason, a transmission cable 9 is assigned to each holding element 7 in the case of the offshore structure 1 that is represented and preferred in this respect. Essentially, individual holding elements 7 without transmission cable 9 could also suffice; this would, however, essentially be less preferred. The transmission cables 9 extend substantially over the entire length of the holding elements 7 between the associated anchor 6 and the floating body 5. Only at the two ends of the holding elements 7 are the transmission cables 9 not directly attached to the holding elements 7. The transmission cables 9 are guided in these regions via protection elements 10 to the respective anchor 6 or to the floating body 5. The protection elements 10 protect the transmission cables 9 against damage to the transmission cables 9 due to the relative movements between the floating body 5 and the anchors 6, which ultimately lead to a relative movement between the holding element 7, on the one hand, and the floating body 5 or an anchor 6, on the other hand. To protect the transmission cables 9, the transmission cables 9 are guided at least in sections through the corresponding protection element 10 between the holding element 7, on the one hand, and the floating body 5 or an anchor 6, on the other hand. The protection element 10 in this way forms a type of protective sleeve for the transmission cable, which is protected externally by the protection element 10.

The transmission cable 9 can in this case be configured as a communication, data transmission or voltage cable and namely depending on the type of transmission that should take place via the transmission cable 9. Signals are in particular considered for the transmission. Additionally or alternatively, a voltage can also be transmitted for operation of a sensor 11 or a measuring system 12. In the present case, each transmission cable 9 is connected to a sensor 11, which is integrated into the associated anchor 9. The sensor 11 is for example a motion sensor and/or a vibration sensor. The sensor 11 generates signals that are transmitted via the transmission cable 9. The transmission cables 9 are therefore each connected to a measuring system 12, which is integrated into the floating body 5. The measuring system 12 evaluates the signals of the sensors 11 and thus determines by means of the signals the state of the anchoring 8. If a critical state of the anchoring 8 is determined, the measuring system 12 can thus output for example an alarm or a corresponding signal. If necessary, the measuring system 12 can in this case be provided with a transmitting apparatus 13 allowing it to send corresponding signals to land such that counter measures can be implemented in a timely manner if this seems expedient owing to the current state of the anchoring 8. In many cases, it is also expedient if the transmission cable 9 has a metallic line and/or at least one optical waveguide 13, in particular an optic fibre cable. Different wires can, however, also be combined, for example to bring about the voltage supply and the signal transmission by means of different lines.

Figure 2:
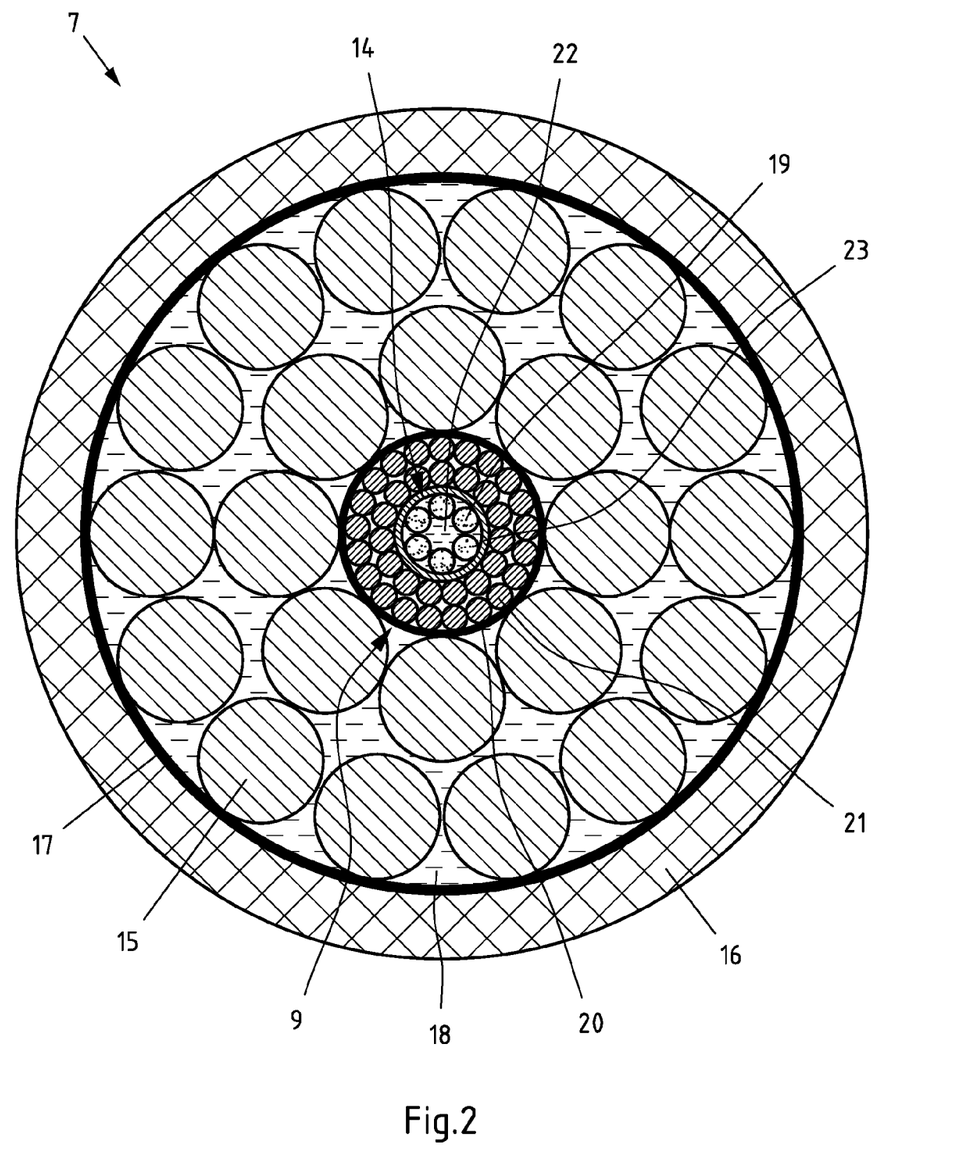
FIG. 2 shows a holding element of the offshore structure from FIG. 1 in a schematic sectional view.

An exemplary holding element 7 of the foundation structure 3 of FIG. 1 is represented in the form of an anchor rope in a section in FIG. 2 into which a transmission cable 9 is integrated in particular in the form of an insert. The transmission cable 9 comprises an optical waveguide 14 here and is received in the middle of the holding element 7 for its protection. A plurality of holding ropes 15 for example made of steel or plastic fibres are provided around the transmission cable 9, which transmit the holding forces of the holding element 7. For the protection of these holding ropes 15, they are covered by an outer covering 16, for example made of a plastic material. A sand protection layer 17 is also provided between the outer covering 16 and the holding ropes 15 in order to protect the holding ropes 15 from fraying. The holding element 7 represented and preferred in this respect also has a filler material 18, which fills the hollow spaces between the holding ropes 15. Thus, a substantially circular cross-sectional shape of the holding element 7 is also provided.

The optical waveguide 14, in the present case, has a plurality of optical fibres 19. The optical fibres 19 are surrounded by a tube element 20. The tube element 20 can be formed of metal and/or at least one plastic material. The tube element 20 serves in particular to protect the optical fibres 19 arranged inside the tube element 20. In order to further improve the protection, a reinforcement layer 21 is provided, formed in the present case by two sub-reinforcement layers, each made of a plurality of reinforcement ropes. The reinforcement layer 21 surrounds in particular directly the tube element 20. Preferably, a first sub-reinforcement layer can be formed of reinforcement ropes, which are, for example, manufactured from steel and the further sub-reinforcement layer can be formed of reinforcement ropes, which are manufactured from a fibre composite material. However, only one sub-layer, more than two sub-layers and/or reinforcement ropes made of another material could also be provided. Furthermore, the tube element 20 is filled with a viscoelastic fluid 22, for example a silicone gel. Furthermore, the optical waveguide 14 in the present case has, as the outer layer, a plastic layer 23, in particular made of extruded plastic, in order to hold the components located therein together.

Figure 3:
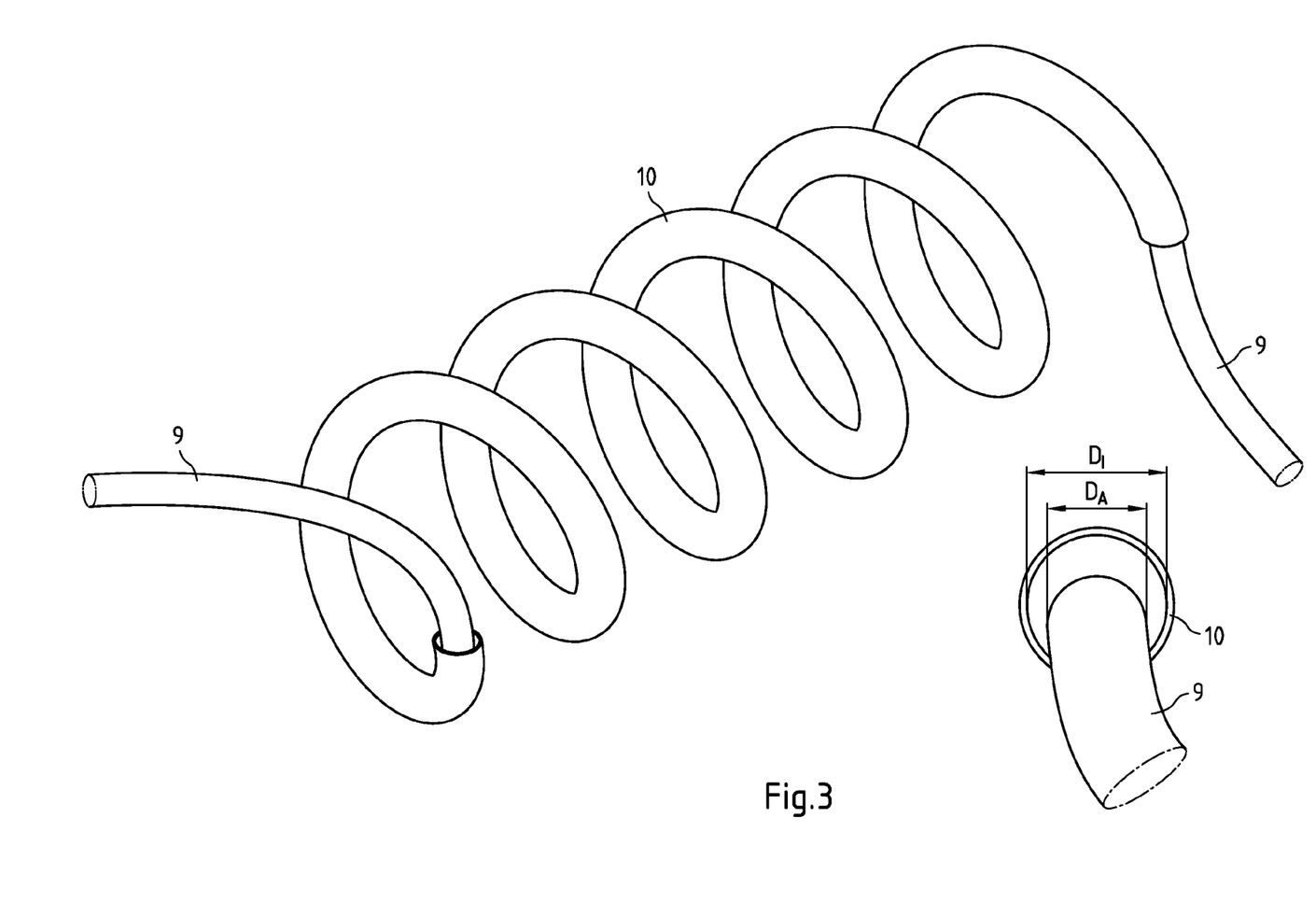
FIG. 3 shows a protection element together with associated transmission cable of the offshore structure from FIG. 1 in a schematic perspective sectional view and in a schematic detail view, FIG. 4AB show the connection between the floating body and a holding element of the offshore structure from FIG. 1 at two different distances.

The transmission cables 9 are guided out of the holding elements 7 in the region of the ends of the holding elements 7 and run at least in sections in a protection element 10, as is represented in FIG. 3. The protection element 10 represented and preferred in this respect is a protection element formed of a tube and through which the transmission cable 9 is guided. In this case, the inner diameter Di of the protection element 10 is somewhat larger than the outer diameter DA of the transmission cable 9. In order to take account of the relative movements between the holding elements 7 and the floating body 5 and the anchors 6, the protection element 10 is bent in the manner of a coil spring. Thus, the longitudinal extension of the protection elements 10 between holding elements 7 and the floating body 5 or the anchors 6 can repeatedly decrease and increase without this leading to the protection elements 10 or the transmission cables 9 being damaged.

Figure 4A:
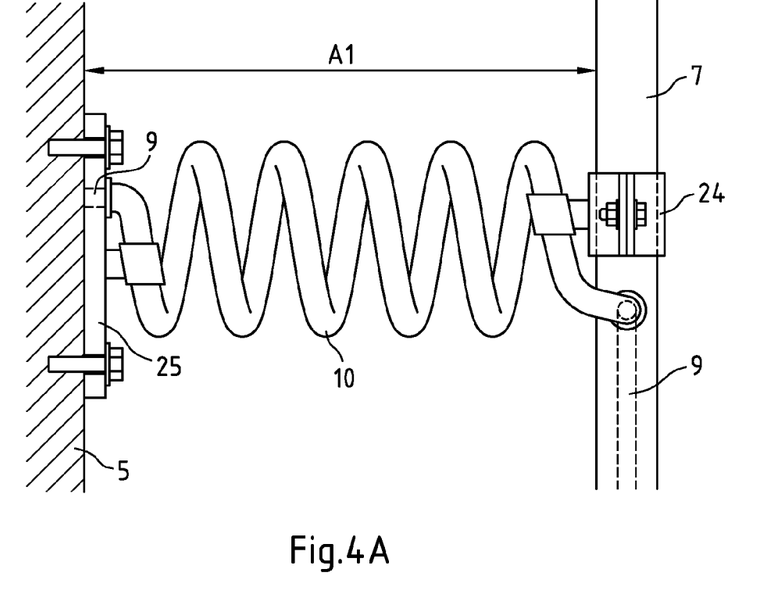
Figure 4B:
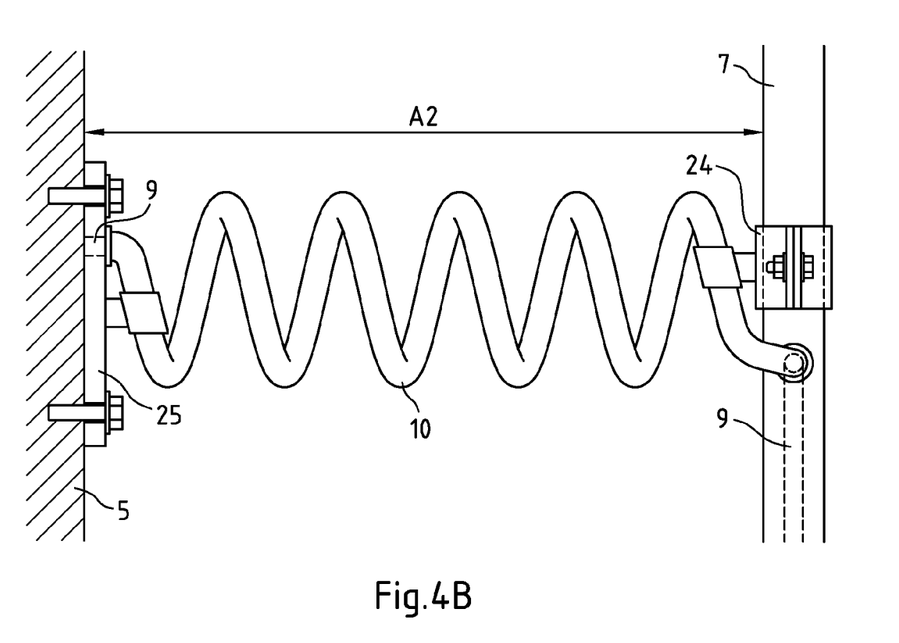

In FIGS. 4AB, the connection between a holding element 7 and the floating body 5 and the connection between a transmission cable 9 and the floating body 5 is represented. The corresponding connections of the holding element 7 and of the transmission cable 9 to an anchor 6 is carried out analogously in the case of the foundation structure 3 that is represented and preferred in this respect. FIGS. 4AB show the same connection, but with the distance A1, A2 between the floating body 5 and the holding element 7 being shorter in FIG. 4A than in FIG. 4B. The protection element 10 is guided into the holding element 7 with one end such that the transmission cable 9 is introduced into the protection element 10 already in the holding element 7. However, this is not absolutely necessary. A clamp element 24 is also assigned to the holding element 7, said clamp element reliably holding and positioning the protection element 10 on the holding element 7. Additionally, the opposing end of the protection element 10 is fixedly connected to the floating body 5 via a connection apparatus 25, which in the present case is formed in particular as a connection plate. The connection apparatus 25 holds and positions the holding element 7 reliably on the floating body 5. A variation in distance between the holding element 7 and the floating body 5 between the distances A1 and A2 of FIG. 4AB leads to a compression or stretching of the protection element 10 formed in the manner of a coil spring, without forces, in a critical order of magnitude, being able to act on the transmission cable 9. Additionally, forces can be transmitted directly and by bypassing the transmission cable 9 from the floating body 5 via the protection element 10 to the holding element 7 and vice versa through the fixed connection of the protection element 10 to the floating body 5 and to the holding element 7. In order to provide sufficient flexibility of the protection element 10 with simultaneous sufficient strength and robustness, the protection element 10 can be formed of a steel, of a plastic and/or of a fibre-reinforced plastic.

The connection of the holding element 7 to the floating body 5 is not represented in detail in FIG. 4AB. This connection is spaced apart from the connection of the floating body 5 to the transmission cable 9 and can take place in a conventional manner, for example via eyelets fixed on the floating body 5. The corresponding holding element 7 is therefore fixedly connected to the floating body 5 by bypassing the at least one transmission cable 9 and the at least one protection element 10.

LIST OF REFERENCE NUMERALS

Offshore structure
Wind turbine
Foundation structure
Foundation
Floating body
Anchor
Holding element
Anchoring
Transmission cable
Protection elements
Sensor
Measuring system
Transmitting apparatus
Optical waveguide
Holding rope
Outer covering
Sand protection layer
Filler material
Optical fibres
Tube element
Reinforcement layer
Viscoelastic fluid
Plastic layer
Clamp element
Connection apparatus
MB Seafloor
MO Surface of the sea

The invention claimed is:
1. A foundation structure of a wind turbine, with a floating foundation, comprising at least one floating body for floating on the surface of the sea, at least one anchor for anchoring the at least one floating body to the seafloor and at least one holding element for holding the at least one floating body to the at least one anchor, the at least one holding element extending from the at least one anchor to the at least one floating body,
wherein at least one transmission cable extends from the at least one anchor along the at least one holding element to the at least one floating body and/or back,
wherein the transmission cable is guided in sections through at least one protection element provided between the holding element and the at least one anchor and/or the at least one floating body, wherein the at least one protection element is fixedly connected to the at least one holding element and/or to the at least one floating body or to the at least one anchor, wherein at least one end of the protection element is inserted into the holding element and/or the floating body or anchor, and wherein the at least one protection element is formed at least in sections, in particular at least substantially completely, by a tube formed in the manner of a coil spring and in that the at least one transmission cable is guided through the protection element.

2. The foundation structure according to claim 1, wherein the at least one holding element is an anchor chain or an anchor rope and wherein, the anchor rope is formed of plastic fibres or of steel wires.

3. The foundation structure according to claim 2, wherein the at least one transmission cable is arranged at least predominantly inside the anchor rope, and wherein the at least one transmission cable is arranged as a braid or as an insert in the anchor rope at least predominantly inside the anchor rope.

4. The foundation structure according to claim 1, wherein the inner diameter of the protection element is greater than the outer diameter of the transmission cable by at least 20%.

5. The foundation structure according to claim 1, wherein the at least one holding element is connected to the at least one floating body by bypassing the at least one transmission cable and/or the at least one protection element and/or in that the at least one holding element is connected to the at least one anchor by bypassing the at least one transmission cable and/or the at least one protection element.

6. The foundation structure according to claim 1, wherein the at least one protection element is formed at least partially of a steel, of a plastic, and/or of a fibre-reinforced plastic.

7. The foundation structure according to claim 1, wherein the at least one transmission cable is a communication cable for data transmission or for data exchange or a voltage cable for supplying voltage to an electrical consumer, and wherein the transmission cable comprises at least one metallic line and/or at least one fibre optic cable.

8. The foundation structure according to claim 1, wherein the at least one transmission cable is connected to a motion sensor and/or vibration sensor, and/or to a measuring system and/or to a light source and/or to a voltage source, and wherein the sensor and/or the measuring system and/or the light source and/or the voltage source is part of the anchor and/or of the floating body.

9. An offshore wind turbine, with a foundation structure, wherein the foundation structure is formed according to claim 1.

* * * * *

UNITED STATES PATENT AND TRADEMARK OFFICE
CERTIFICATE OF CORRECTION

PATENT NO. : 12,286,762 B2
APPLICATION NO. : 17/605624
DATED : April 29, 2025
INVENTOR(S) : Christian Jahn et al.

Page 1 of 1

It is certified that error appears in the above-identified patent and that said Letters Patent is hereby corrected as shown below:

On the Title Page

Column 2, item (57), Abstract, Line 5, after "body" insert -- to --

Signed and Sealed this
Seventeenth Day of June, 2025

Coke Morgan Stewart
*Acting Director of the United States Patent and Trademark Office*